United States Patent
Qiu et al.

(10) Patent No.: US 6,804,782 B1
(45) Date of Patent: Oct. 12, 2004

(54) COUNTERMEASURE TO POWER ATTACK AND TIMING ATTACK ON CRYPTOGRAPHIC OPERATIONS

(75) Inventors: Xin Qiu, Del Mar, CA (US); Eric J. Sprunk, Carlsbad, CA (US); Daniel Z. Simon, San Diego, CA (US); Lawrence Tang, Del Mar, CA (US); Lawrence R. Cook, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/373,866

(22) Filed: Aug. 13, 1999

Related U.S. Application Data
(60) Provisional application No. 60/138,909, filed on Jun. 11, 1999.

(51) Int. Cl.[7] .............................. G06F 11/30; H04L 9/28
(52) U.S. Cl. .......................... 713/194; 713/193; 380/30
(58) Field of Search ................................ 713/172, 174, 713/193, 194; 380/30, 44

(56) References Cited

U.S. PATENT DOCUMENTS

| | | | |
|---|---|---|---|
| 5,802,063 A | 9/1998 | Deiss | 370/476 |
| 5,920,572 A | 7/1999 | Washington | 370/535 |
| 5,920,626 A | 7/1999 | Durden et al. | 380/10 |
| 5,923,385 A | 7/1999 | Mills | 348/715 |
| 5,926,647 A | 7/1999 | Adams et al. | 395/800.36 |
| 5,937,067 A | 8/1999 | Thatcher et al. | 380/21 |
| 6,064,740 A | * 5/2000 | Curiger et al. | 380/265 |
| 6,298,442 B1 | * 10/2001 | Kocher et al. | 713/194 |

OTHER PUBLICATIONS

High Speed RSA Implementation, RSA Laboratories Technical Report TR–201 Version 2.0, Nov. 22, 1994 by Cetin Kaya Koc.

Timing Attacks on Implementations on Diffie–Hellman, RSA, DSS and Other Systems, Cryptography Research, May 11, 1999 by Paul C. Kocher.

Cryptographers Discuss Finding of Security Flaw in "Smart Cards", The New York Times, Jun. 10, 1998 by Peter Wayner.

Code Breaker Cracks Smart Cards' Digital Safe, The New York Times, Jun. 22, 1998 by Peter Wayner.

A Method for Obtaining Digital Signatures and Public–Key Cryptosystems, Communications of the ACM, vol. 21, No. 2, Feb. 1978 by R.L. Rivest, A. Shamir and L. Adleman.

Timing Attacks on Cryptosystems, A Bulletin from RSA Laboratories, No. 2, Jan. 23, 1996 by Dr. Burt Kaliski.

Introduction to Differential Power Analysis and Related Attacks, Cryptography Research, Inc., 1978 by Paul Kocher, Joshua Jaffe, and Benjamin Jun.

U.S. Provisional application No. 60/087,829, Kocher et al.

* cited by examiner

Primary Examiner—Matthew Smithers
(74) Attorney, Agent, or Firm—Townsend and Townsend and Crew LLP; William F. Vobach (57) ABSTRACT

A cryptography circuit provides secure processing of data by utilizing countermeasures that combat timing and power attacks. Superfluous operations such as multiplication operations, modular reductions by an integer, storage of data to memory are available for use by a processor to disguise the amount of power usage and the amount of time required to perform a cryptographic operation. A cryptographic key is available for use in order to trigger when these emulated operations occur. The occurrences of the emulated operations is controlled by the user to provide the preferred tradeoff between security and use of resources.

22 Claims, 9 Drawing Sheets

| CODE | MEMORY ALLOCATION |
|---|---|
| // NewKey execute when a new Key is delivered<br>NewKey { | Take key size 1024 (bit) as an example |
| store new key e (exponent) | e_Register: [1023]=1 ... [2]=1 [1]=0 [0]=1 |
| store new modulus (n) | n_Register: [1023]=1 ... [2]=1 [1]=0 [0]=1 |
| store k, the number of bits in n | k_Register: [15]=x ... [1]=x [0]=1 |
| calculate & store n' ( r * r^(-1) - n * n' = 1 )<br>where r = 2^k ( 2^(k-1) <= n < 2^k )<br>} | n'_Register: [1023]=1 ... [2]=x [1]=x [0]=1 |

| Op # | // Montgomery Exponentiation Routine<br>ModExp(M, e, n) { | |
|---|---|---|
| step 1 | M = BigMod(M*r, n);  // M * r mod n<br>Note: see BigMod() implementation | Temporary Holding Registers:<br>Temp1_Reg(2048 bits)<br>Temp2_Reg(2048 bits)<br>Temp3_Reg(2048 bits);<br>Constant Variable Register:<br>M_Register (k bits = 1024) |
| step 2 | x = (1 * r) mod n = r-n; //because r > n | x_Register: [2047]=x ... [2]=x [1]=x [0]=1 |
| step 3 | for i=k-1 down to 0 do | |
| step 4 | x = MonPro(x,x) ——— Squaring Operation | Re-Use Temporary Holding Registers:<br>Temp1_Reg for t, Temp2_Reg for m,<br>and Temp3_Reg for u (see MonPro()<br>implementation) |
| step 5 | if (ei==1) x=MonPro(M,x) ——— Multiply Operation | copy the result of MonPro() from<br>Temp3_Reg to x Register |
| step 6 | else { | |
| step 7 | if counter > 0 { | counter_Register: [15]=x ... [1]=x [0]=1 |
| step 8 | return MonPro(M, x) to Temp1_Reg | Note: pre-loaded counter_Register (to load the value of 128, only 8 bits counter is needed. |
| step 9 | counter- } | |
| step 10 | x = MonPro (x, 1) | copy the result of MonPro() from<br>Temp3_Reg to back x_Register |
| step 11 | return x | |

*FIG. 8.*

```
// BigMod performs a modulo reduction on a 2k bit number
//
// Calculates R = t mod n
//
BigMod(t, n){
    temp1 = t                              // t = M * r, right shift M k bits, t is in Temp1 Register (Temp1_Reg)
    temp3 = 2^k * n                        // right shift n k bits, so temp3 is stored in Temp3 Register (Temp3_Reg)
    temp1_valid = TRUE                     // boolean to determine if temp 1 or temp2 should be used.
    for (i = 0; i < k; i++){
        if (temp1_valid==TRUE){
            if (bit (2*k - i) of temp1==1){
                BigSub(temp1, temp3, temp2)
                if (temp2 >=0) temp1_valid = FALSE     // temp2 = temp1 - temp3
            }
        }
        else {
            if (bit (2*k - i) of temp2 == 1){
                BigSub(temp2, temp3, temp1)            // temp1 = temp2 - temp3
                if (temp1>=0) temp1_valid = TRUE
            }
        }
        temp3 >> 1                                     // divide the temp3 (modulus by 2)
    }
    return (temp1_valid)                   // tell calling task if the result is in temp 1 or temp2
                                           // copy k least significate bits of temp1 or temp2 to M_Register
}
```

FIG. 9.

```
/// MonPro executes numerous times as called in ModExp
MonPro(a,b){
    t = a*b              // a is a k-bit vale, and b is also a k-bit value, so t maximumly has 2K+1 bit value
                         // store t at Temp1_Reg
    m = (t * n') mod r   // since r = 2^k, result is the least significat k bits of t *n'
                         // conducting the multiply of lsb k bits of n' with t is sufficient.
                         // so allocating 2k+1 for m, and store m in Temp2_Reg.
    u = (t + m * n) / r  // u is the most significate k bits of t + m * n, store u in Temp3_Reg.
    if (u > = n) return
    (u - n) else return u
}
```

FIG. 10.

COUNTERMEASURE TO POWER ATTACK AND TIMING ATTACK ON CRYPTOGRAPHIC OPERATIONS

CROSS-REFERENCES TO RELATED APPLICATIONS

This application claims the benefit of U.S. Provisional Application No. 60/138,909 filed on Jun. 11, 1999.

BACKGROUND OF THE INVENTION

This invention relates generally to the field of cryptography and more specifically to preventing the breaking of a cryptographic system's private key through the use of power-monitoring and timing-monitoring techniques.

Recently, it has been discovered that cryptographic key information can be obtained from a secure processor by monitoring the time it takes the processor to perform coding and/or decoding operations. In addition, monitoring the power during the course of such operations can be used as a way to attack the processor's security. For example, this can occur when the functions of multiplication and squaring utilize different amounts of time and power. Thus, an individual who is mounting an attack can break a private key by tracking the amount of time and power required for many different messages input to a secure device. Being able to watch power use and time use eventually can reveal the key.

Although countermeasures exist to combat discerning keys by power or timing attacks, these countermeasures have not produced a technique that is effective against both types of monitoring. Also, the use of these countermeasures can require large amounts of memory, processor cycles, additional circuitry, power, or other resources. This is unacceptable, for example, when the secure processor is in a power-limited environment such as in a battery-powered "smart card" where power, speed, and available surface area for circuitry are important.

Thus, it is desirable to provide a countermeasure technique that works effectively against both power and timing monitoring attacks while still having a low resource requirement. It is also desirable to counter these power and timing attacks while incurring a limited performance penalty.

SUMMARY OF THE INVENTION

The present invention uses emulated cryptographic operations to disguise time usage and/or power usage by a cryptography system. For example, one embodiment of the invention performs unnecessary mathematical operations and/or unnecessary storage of data in order to disguise whether a mathematical operation or store actually took place in an algorithm. The total number of emulated operations can be controlled so that the power and processor cycle time used by the emulated multiplies remains efficient.

In one embodiment, the invention provides a method of disguising power usage and time usage in a processing system that uses a private key to perform cryptographic operations. The processor performs emulated multiply operation(s) in order to mask one or more bits of the key. This embodiment of the invention can be advantageous in that it disguises whether the key dictated that a multiply operation should or should not be performed. Because of the unnecessary multiply operation, an attacker sees unpredictable time usage and similar power usage regardless of the value of the bit in the key. Hence, the value of the key is maintained as secure. As a further act, the result of the emulated multiplication can be stored to a dummy memory location—which further emulates the procedure followed when a necessary multiplication/store feature is dictated by the key.

Further advantages and features of the invention will be apparent to those skilled in the art from a consideration of the following description taken in conjunction with the accompanying drawings. It is understood that the invention is not limited to the details disclosed, but rather, includes all such variations and modifications that fall within the spirit of the invention and scope of the appended claims.

DESCRIPTION OF THE SPECIFIC EMBODIMENTS

The invention will now be described with reference to a decryption system. However, it should be understood that the invention can also be applied to other cryptographic systems that do not involve decryption. For example, the invention could be used in what those of ordinary skill in the art refer to as private key based systems, especially discrete logarithm systems and integer factorization systems. The use of the decryption examples, however, will help to illustrate the invention.

Figure 1:
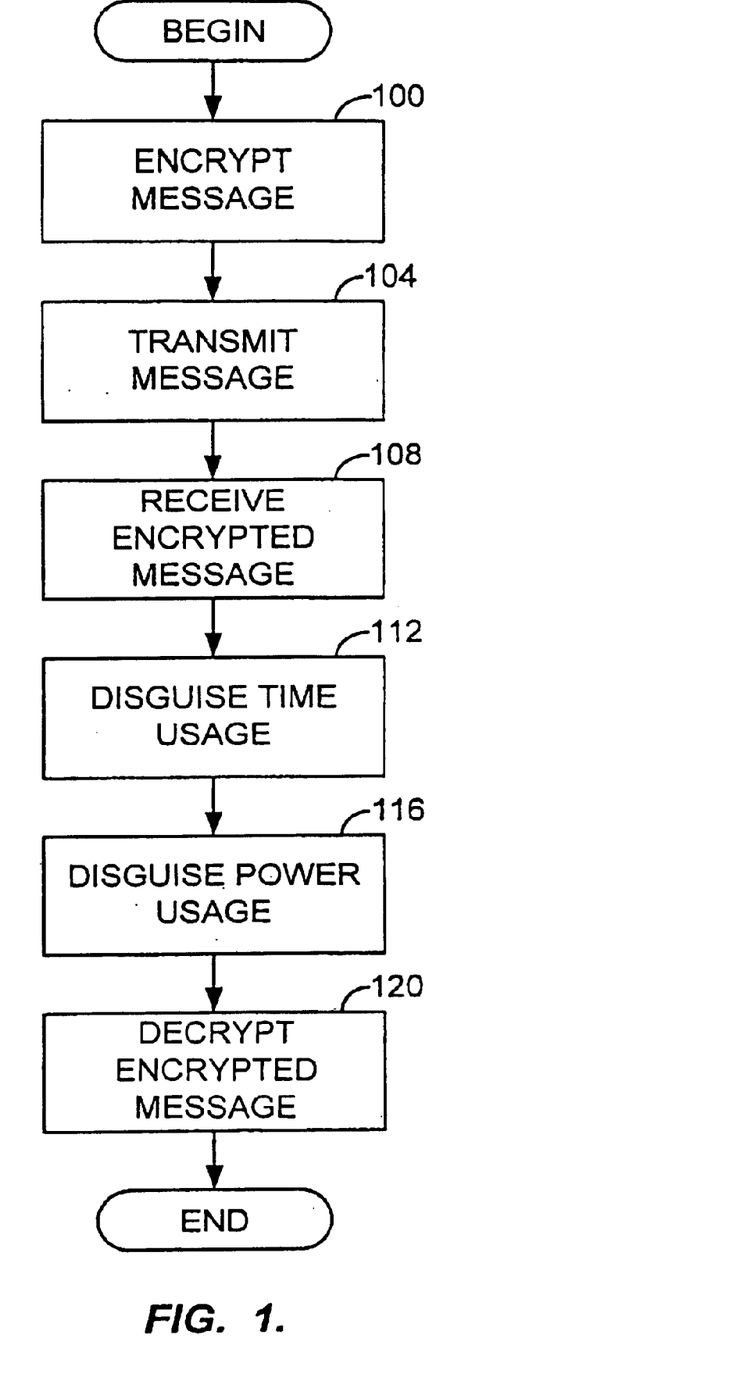
FIG. 1 shows a flowchart that demonstrates a method of practicing one embodiment of the invention.

Referring now to FIG. 1, a flowchart demonstrating an overview of one embodiment of the invention can be seen where decryption is employed. In FIG. 1, a message is first encrypted 100. Encryption can be accomplished by a variety of encryption methods that are well understood by those of ordinary skill in the art. After the message is encrypted, it is transmitted 104 to its destination. It is envisioned that this transmission could involve not only a simple point to point transmission but also a more convoluted routing before reaching the end-user for whom the encrypted transmission is intended. Eventually, the encrypted transmission is received 108. After receipt, the processing of the transmission is begun, e.g., by decrypting the message. As shown in FIG. 1, while the encrypted message is being decrypted 120, the amount of time required to decrypt 112 and the power required to decrypt the message 116 are disguised. In this fashion, the invention resists both a timing attack and a power attack being mounted by an attacker. Furthermore, resisting such power and timing attacks can be accomplished simultaneously.

Figure 2:
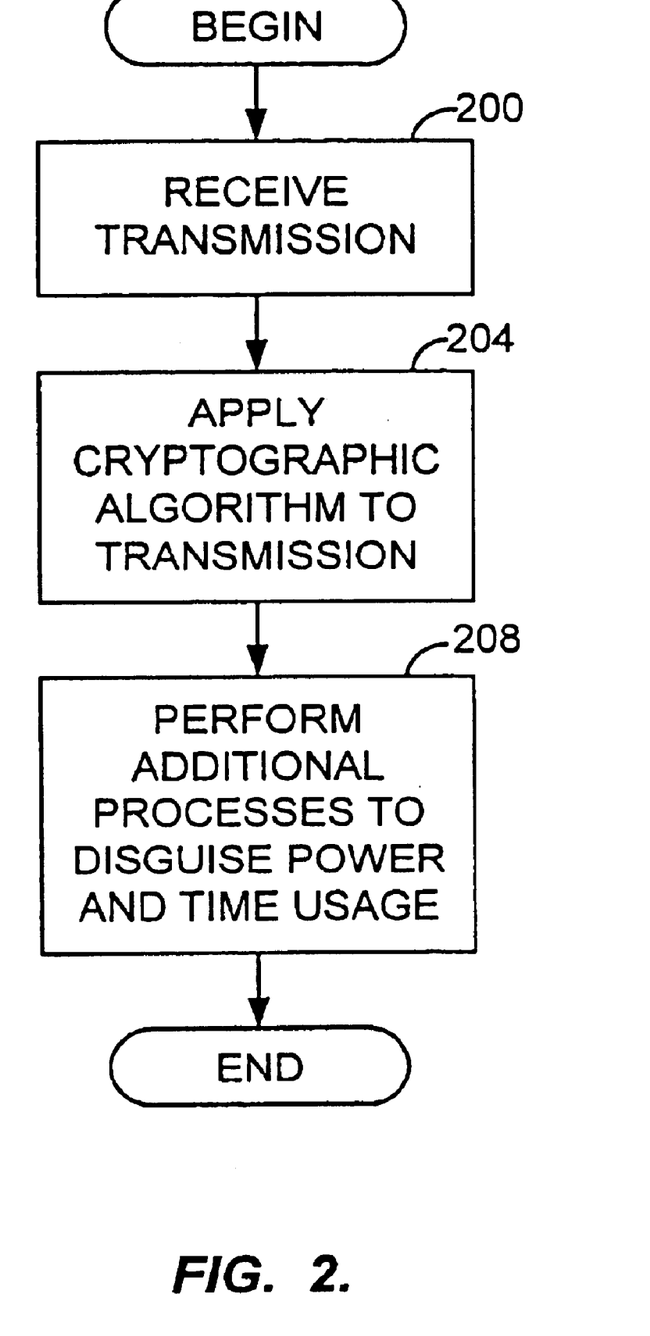
FIG. 2 shows a flowchart that demonstrates one embodiment for disguising power usage and time usage.

Turning now to FIG. 2, a flowchart of a further embodiment of the invention can be seen. Namely, in FIG. 2, the end-user first receives the transmission 200, e.g., an encrypted transmission. Then, a cryptographic algorithm, e.g., a decryption algorithm, is applied to the transmission to process the data 204. Oftentimes, this is accomplished by algorithms that operate in the same manner but utilize different "keys", i.e., numbers, that result in different outcomes. For example, when a modular exponentiation algorithm is implemented, a public key and a private key are utilized; however, the basic mathematical algorithm is the same for when each key is used. For further background on various cryptography algorithms, one can refer to *Applied Cryptography*, Second Edition, John Wiley & Sons, Inc., by Bruce Schneier, 1996, the contents of which are hereby incorporated by reference. Continuing with FIG. 2, while the decryption algorithm is being applied, additional processes are performed to disguise power usage and time usage 208. While it is envisioned that these additional processes will take place during the processing of the algorithm itself, in other embodiments they could take place after the algorithm is complete. Again, the decryption process is merely an example, the invention could be employed in other cryptographic processes-especially private key systems.

The additional processes that are envisioned to provide the best deception are those processes that occur as elements of the normal algorithm. For example, such processes could include the performance of additional mathematical operations that are completely unnecessary. Furthermore, the processes could include a store to memory that is unnecessary, i.e., not required by the normal functioning of the algorithm. Similarly, one of the additional processes could include a modular reduction operation which is often performed as part of many of the cryptographic algorithms. When possible, deception will be gained by utilizing the same circuitry which implements the necessary steps of the algorithm to perform the unnecessary steps as well. Use of such circuitry reduces the use of additional resources and creates similar power and unpredictable time usage signatures since the same components are used to accomplish the necessary and unnecessary processes. Other types of processes that can be emulated will be apparent to those of ordinary skill in the art.

A benefit that is obtained by practicing these additional operations is that an attacker who is watching the time required to process the transmission (e.g., decrypt data) and/or the power required to process the transmission will be fooled. This is especially true when the additional processes that are being performed are conditional processes that one would expect to occur as part of the cryptographic algorithms. Take for example the application of the modular exponentiation algorithm in a private key system. One expects multiplication operations to occur in accordance with values of the bits of a private key. For example when the value of a bit in the private key is a "1" an associated multiplication operation occurs. When the value of the bit in the key is a "0", no associated multiplication occurs. Hence, an attacker would try and decipher the key by monitoring to see whether this corresponding multiplication operation occurred or not. As those of ordinary skill in the art are aware, various separate power and timing attacks have been envisioned to perform such a decipher. Hence, because the multiplication is conditioned on whether the value of the bit is "0" or "1", an attacker would be fooled by a process that always performed the multiplication regardless of the value of the bit, especially if the same circuitry was used to do so. In this fashion, the attacker is left to wonder whether the multiplication result was actually used or not.

This process can be taken further by emulating the actual operations that would be performed after the multiplication is complete. For example, a store to memory of the multiplication result would often occur once the necessary multiplication is accomplished. When an emulated (or unnecessary) multiplication is performed, the result can be stored to memory as well. Even though the result that is stored to memory is not required by the algorithm, the power and time usage that results from performing the operation will help deter an attacker from deciphering the value of the decryption key.

This disguise can be taken even further by performing additional operations to simulate the operation of the conditional aspects of the algorithm. For example, a modular reduction operation can be performed when it is unnecessary so as to further emulate the modular exponentiation algorithm. While all of these activities need not be performed, the use of some, a few, or all of them will help to disguise the process and ensure the security of the cryptographic system, such as the value of a private key.

Figure 3:
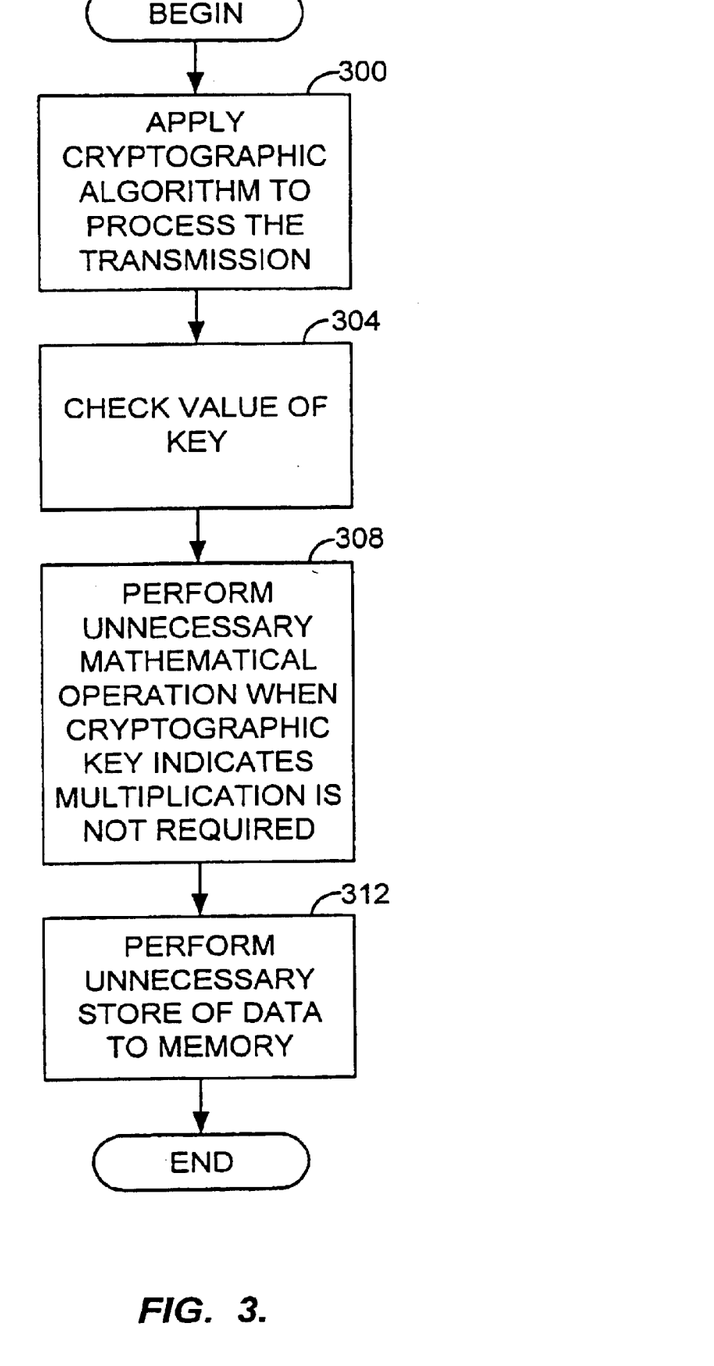
FIG. 3 shows a flowchart for another embodiment of the invention that demonstrates how power usage and time usage can be disguised.

FIG. 3 shows an embodiment of the invention which further illustrates the manner in which a cryptographic system can be protected. First, a cryptographic algorithm such as a modular exponentiation algorithm which utilizes a cryptographic key is applied to process the transmission 300, e.g., to decrypt a transmission with a decryption key. Then, while the algorithm is being implemented, a value of the key is checked 304. For example, in the modular exponentiation algorithm a bit value in the binary key is checked. Then, depending on the checked value of the key, an unnecessary mathematical operation is performed 308, i.e., a mathematical operation that would not be required for a normal application of the algorithm. Then, to further emulate the implementation of the algorithm, an unnecessary store of data to memory is performed 312.

Figure 4:
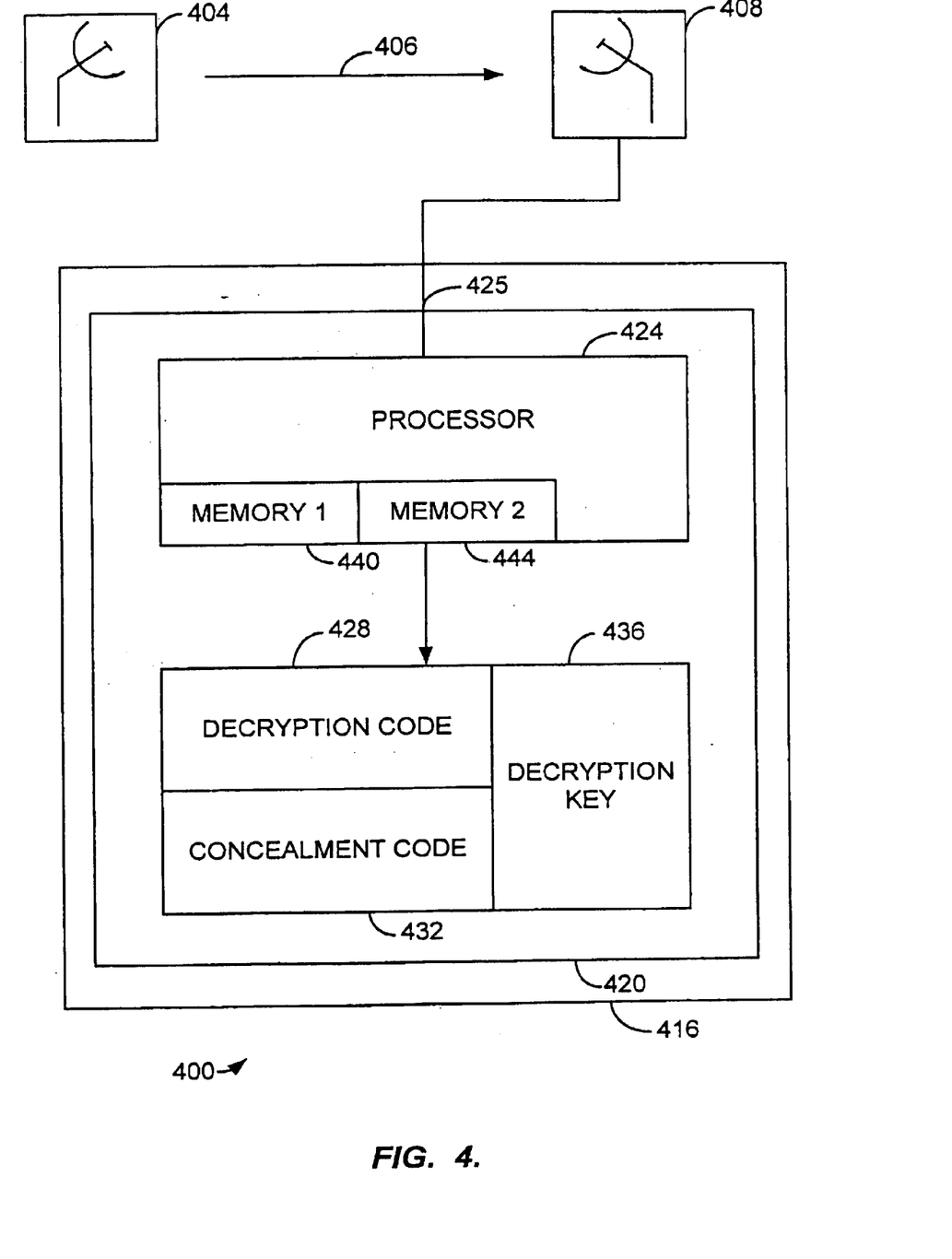
FIG. 4 shows a block diagram of a system for practicing one embodiment of the invention.

Turning now to FIG. 4, a system 400 for implementing an embodiment of the invention is shown. In FIG. 4, a transmitter 404 transmits a transmission 406 to a receiver 408. The receiver 408 is coupled to a set-top box 416. The set-top box utilizes a circuit to process the transmitted data. As explained earlier, this circuit is operable to disguise power usage required to process the data during the cryptographic processing of the data. Furthermore, as explained earlier, the circuit is operable to disguise the amount of time required during the cryptographic processing of the data. While a set-top box is used for purposes of illustrating the invention, the invention can be utilized in many different types of devices where cryptography is employed. For example, in addition to the set-top boxes, the invention could be utilized in a digital television, a PCMCIA card, etc. For purposes of this patent, such devices shall be referred to as consumer electronic devices.

Preferably, the circuit will be implemented utilizing an integrated circuit 420. As can be seen in FIG. 4, a processor, such as microprocessor 424, is disposed on the integrated circuit and receives the transmission signal through input 425. The processor is coupled to a first memory 440. The processor may also be coupled to a second memory 444. The processor is also coupled to a program storage area which holds cryptographic code such as decryption code 428 and concealment code 432. The cryptographic code utilizes a cryptographic key 436 which also is shown stored in memory. The cryptographic code 428 is suitable for use by the processor 424 and causes the processor to perform the cryptographic algorithm. However, at the same time the concealment code 432 is also implemented. In this way, the normal processing of the data is performed while the concealment or disguising of the algorithm is also accomplished. The concealment code 432 causes unnecessary operations to occur so as to disguise power usage and time usage required by a normal processing of the transmission. A variety of unnecessary operations could be implemented. For example, as explained earlier, an unnecessary multiplication could be implemented by the processor as a result of the concealment code. Similarly, an unnecessary storage of data to memory or unnecessary modular reduction operation might be implemented. However, the best disguise will be achieved by implementing all of these unnecessary operations so as to emulate the necessary processes of the algorithm.

The cryptographic code and concealment code are shown in FIG. 4 as separate sections to better illustrate the functioning of the system. However, it should be noted that these two code sections will typically be parts of a single program, as would be understood by one of ordinary skill in the art. In that way, the emulation operations required by the concealment code are conducted at appropriate times during the normal cryptographic process.

The cryptographic key 436 will typically have a binary representation. For example in the modular exponentiation algorithm, each bit of the cryptographic key indicates whether a modular multiplication operation should be performed. In one embodiment, the concealment code is operative to cause the processor to perform an emulated modular multiplication operation when one of these bits indicates that no modular multiplication is necessary. In this fashion, an attacker is fooled into thinking that the value of the bit was different from its actual value because the modular multiplication actually occurred.

The second memory 444 can be utilized to emulate a store to memory. While it is envisioned that an emulated store to memory can be accomplished by those of ordinary skill in the art even without the additional memory, memory 444 helps to demonstrate the point. Namely, while the actual cryptographic process uses the first memory 440, the second memory 444 can be utilized when unnecessary stores to memory are required. In this fashion, the power usage caused by the store to memory fools the attacker; but, at the same time, the data required by the cryptographic routine which is stored in memory 440 is not disrupted. Hence, with a small amount of additional memory, the cryptographic algorithm can be emulated and security can be maintained or bolstered without the addition of a great deal of extra circuitry.

Figure 5:
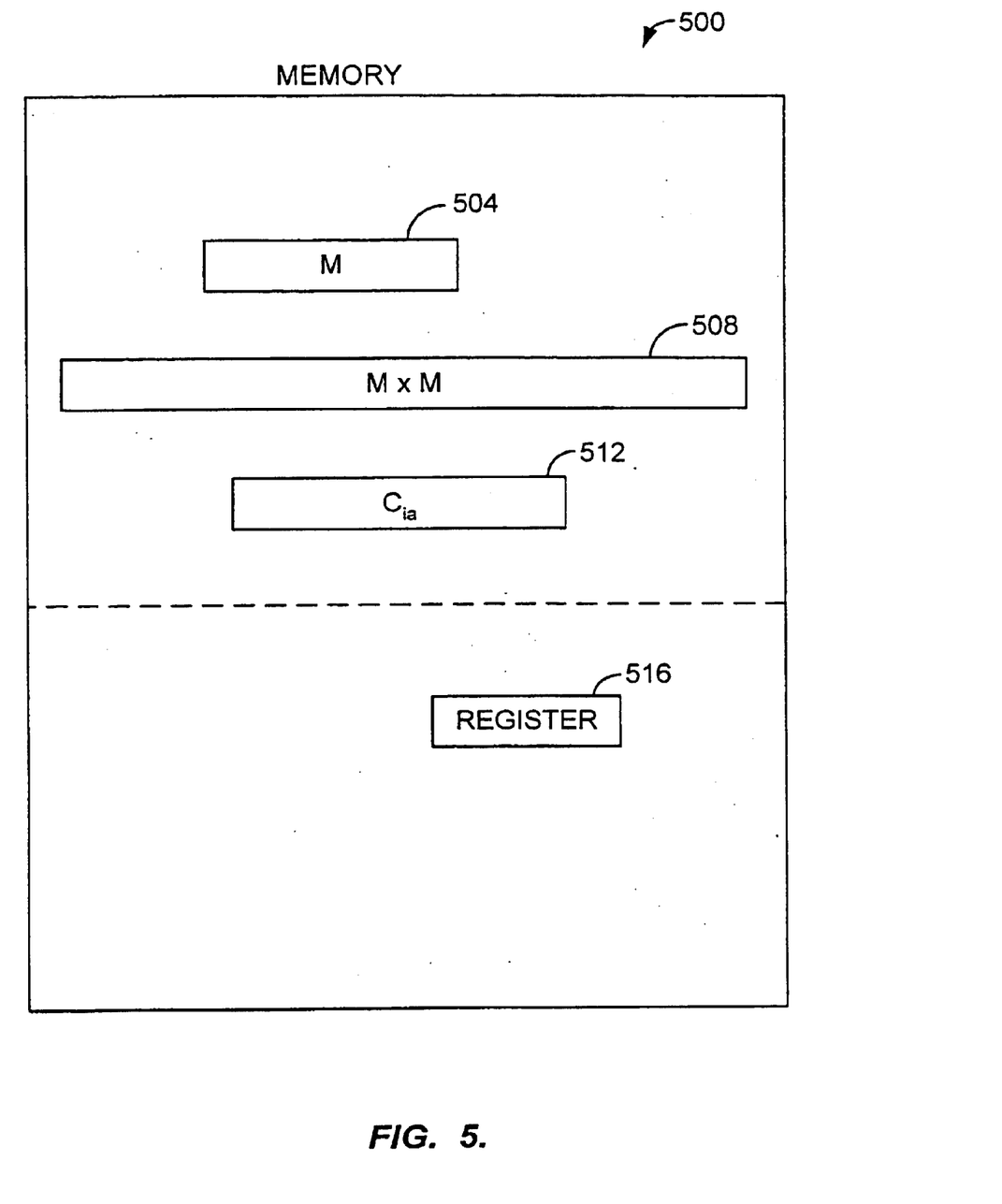
FIG. 5 shows a block diagram of memory storage locations for performing a modular multiplication as one embodiment of the invention.

FIG. 5 provides a look in greater detail at one embodiment's allocation of memory. FIG. 5 will be described with reference to the modular exponentiation algorithm. In the modular exponentiation algorithm, a value M is first squared and then a modular reduction by an integer n is performed on the resulting value of M-squared. Then, depending on the value of the corresponding bit in the binary representation of the algorithm's key, the result of the modular reduction is multiplied by M and finally modularly reduced by n again. For example, assume that the value "1" indicates multiplication and that the value "0" indicates no multiplication. In that case, if the applicable value of the bit is "1", then the value ((M×M) mod n) is multiplied by M and then another modular reduction by n is performed This process occurs for every bit in the algorithm's key. Consequently, FIG. 5 demonstrates the memory blocks that are necessary to store the various values in order to accomplish the algorithm. The initial value of M is stored in a memory location 504. This memory location is indicated to be 1024 bits long, for purposes of this example. The square of M is then accomplished and stored in memory location 508 which is indicated to be 2048 bits long. Then, the result of the modular reduction by n can be stored in memory location 512. This result is represented as $C_{ia}$ and as 1024 bits long in FIG. 5.

At this stage, if the value of the key bit is "1"—indicating modular multiplication—the value of $C_{ia}$ can be multiplied by M and stored in memory location 508. Then, this value can be modularly reduced by n and again stored in location 512—replacing the previous value of $C_{ia}$. However, if the value of the bit in the key is "0", no modular multiplication is necessary; yet, to fool the attacker the normal multiplication/modular reduction/store to memory process is implemented. So, the use of register 516 can be used to accomplish the emulated process while not corrupting the value Of $C_{ia}$ stored in memory location 512. This can be accomplished by multiplying $C_{ia}$ by M and storing the result in memory location 508. This value is then modularly reduced by n and stored in memory location 516—rather than memory location 512. Again, this preserves the value of $C_{ia}$ stored in memory location 512 while at the same time emulating or faking that the value of the key bit was a "1" and not a "0." In addition, it does not require a great deal of extra memory, as the data in memory location 516 can simply be written over. In fact, as shown below, the Montgomery algorithm can be implemented without any additional memory.

Figure 6:
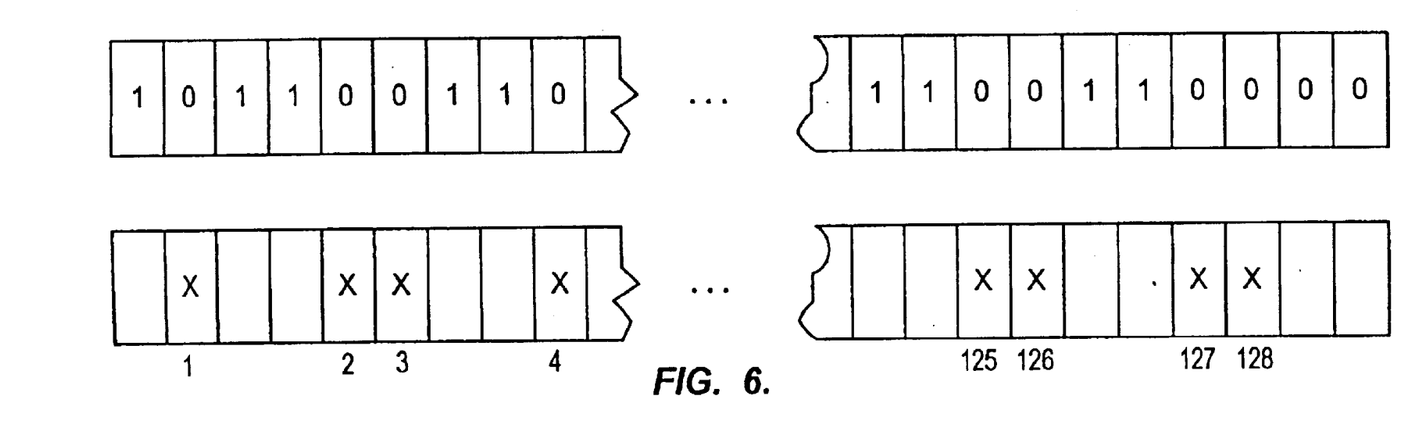
FIG. 6 shows a binary representation of a private key used in one embodiment of the invention, as well as bit value locations where emulated operations occur for the first 128 occurrences of zeros in the private key.

Not every conditional operation in a cryptographic algorithm need be emulated in order to secure the cryptographic process. For example in the Montgomery algorithm, it is envisioned that only the first 128 occurrences of "0" bits of a 1024 bit private key need be emulated as "1's," i.e., have some of the operations emulated that a "1" would normally require, in order to withstand an attack. Such a scenario is shown in FIG. 6. In FIG. 6, the private key is shown as the upper row. The lower row shows the locations that correspond to the first 128 occurrences of zeros in the private key. Hence, at those locations, emulation processes occur. Emulation of 128bit locations is believed to add a proper tradeoff between security and processor speed. For a more detailed breakdown of the penalties incurred by various emulation schemes, see U.S. patent application Ser. No. 60/138,909 filed on Jun. 11, 1999, entitled "Method and System for ountering a Power Attack and Timing Attack on Integer Factoring and Discrete ogarithm Problem-Based Private Key Operations", which is hereby incorporated by reference.

It should be noted that security will be improved with merely the emulation of a single bit of a key. Hence, one need not emulate 128 or more bits in order to gain security. It is just envisioned that emulation of 128 bits will deliver a secure transmission while not degrading resources to a level that disrupts the process totally.

One embodiment of the invention utilizes the emulated operations as early as possible in the iteration to disguise the earliest bits utilized from the key. Because it is most difficult to break the key when the initial bits of the key which are used are disguised, this embodiment concentrates the emulated operations at the initial values of the key that are used. In this fashion, an attacker will face the greatest challenge when attacking the key as compared to emulated operations that occur later in the key. See, for example, the discussion in "Timing Attacks on Implementations of Diffie-Hellmann, RSA, DSS and Other Systems" by Paul C. Kocher.

Figure 7:
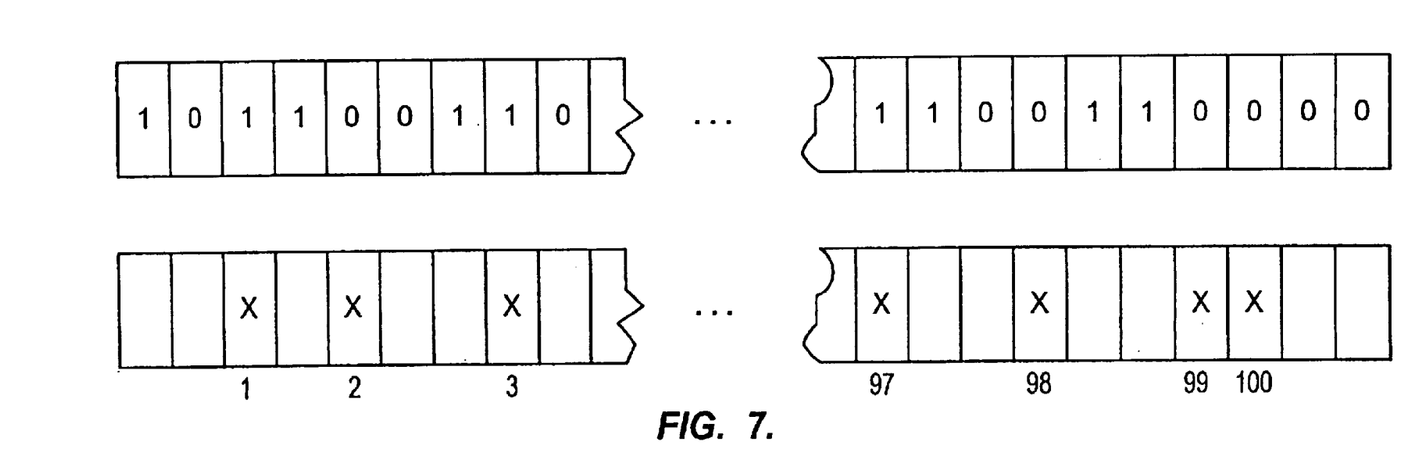
FIG. 7 shows a binary representation of a private key used in one embodiment of the invention along with a representation where predetermined emulated operations would occur if the value of the private key bit is zero.

Another embodiment of the invention utilizes the emulated operations at fixed locations. In this manner, if a "0" bit occurs at a fixed location where an emulated operation is indicated, then an emulated process will be performed. This is shown in FIG. 7 in which the upper row shows the key. The lower row in FIG. 7 shows the locations where emulated operations can occur if the corresponding value of the key is a zero. In FIG. 7, emulated operations would occur in correspondence with emulation bit locations 2, 98, 99, and 100. FIG. 7 also shows an example where less than 128 bits are utilized to trigger emulations. Again, this number could be as low as 1 while still providing some security.

Figure 8:
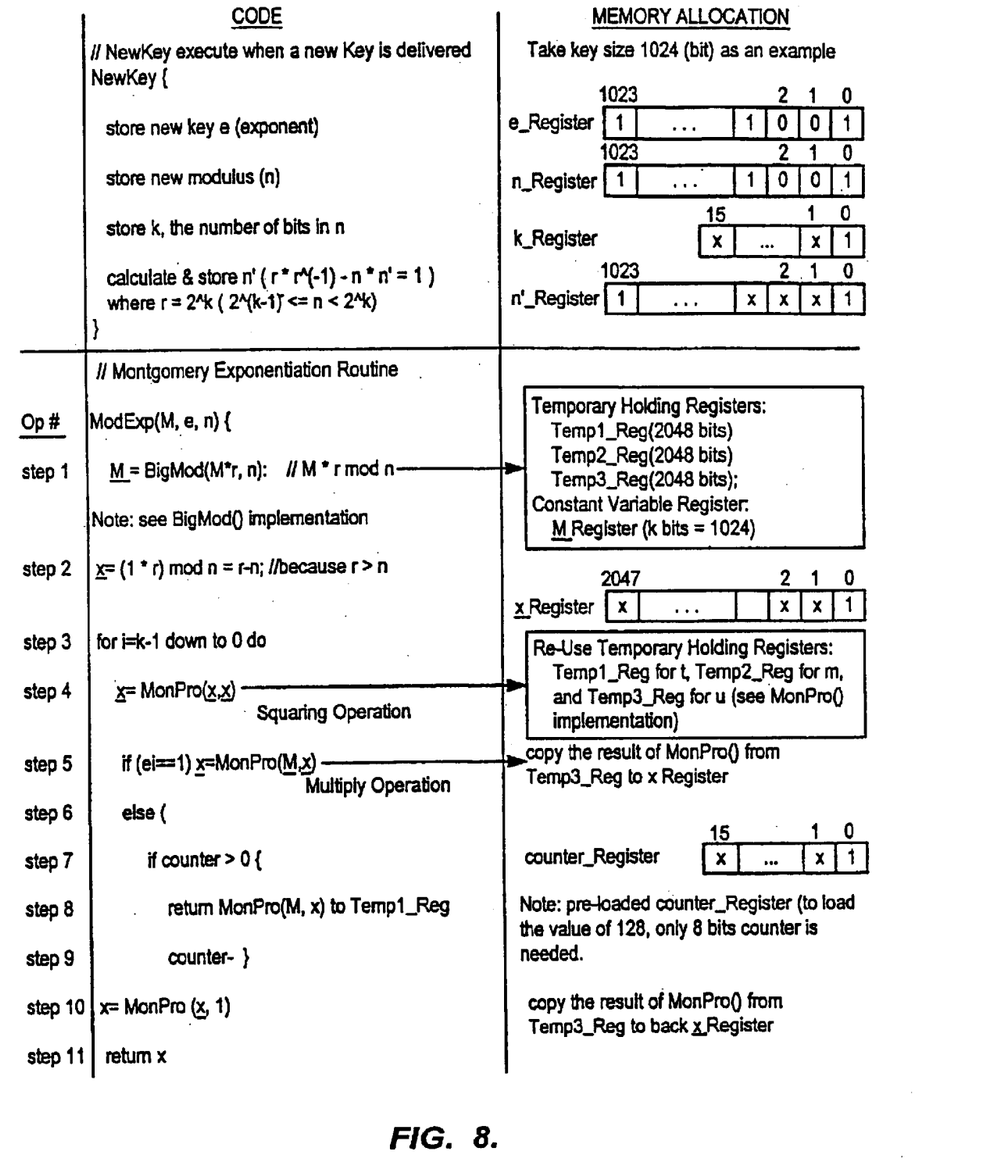
FIGS. 8, 9, and 10 show an example of how the invention can be implemented to disguise the Montgomery algorithm.
Figure 9:
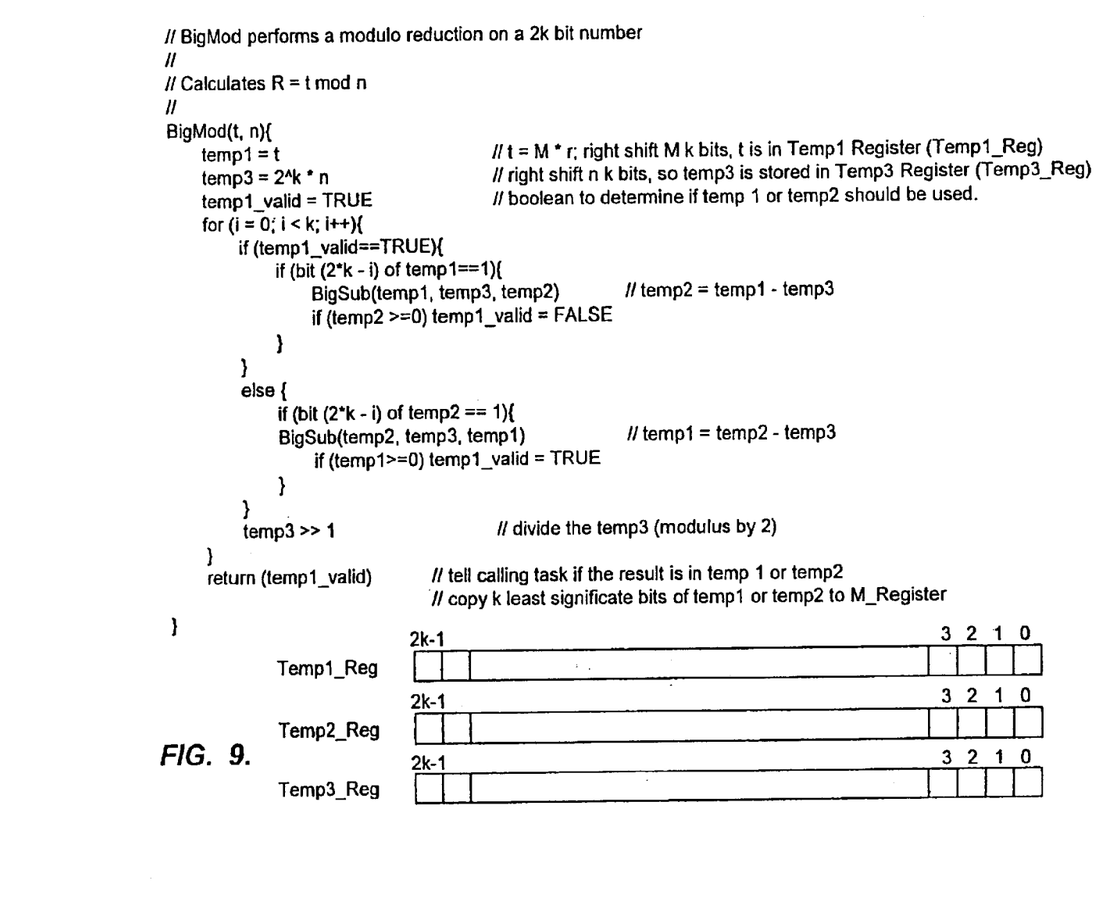
Figure 10:
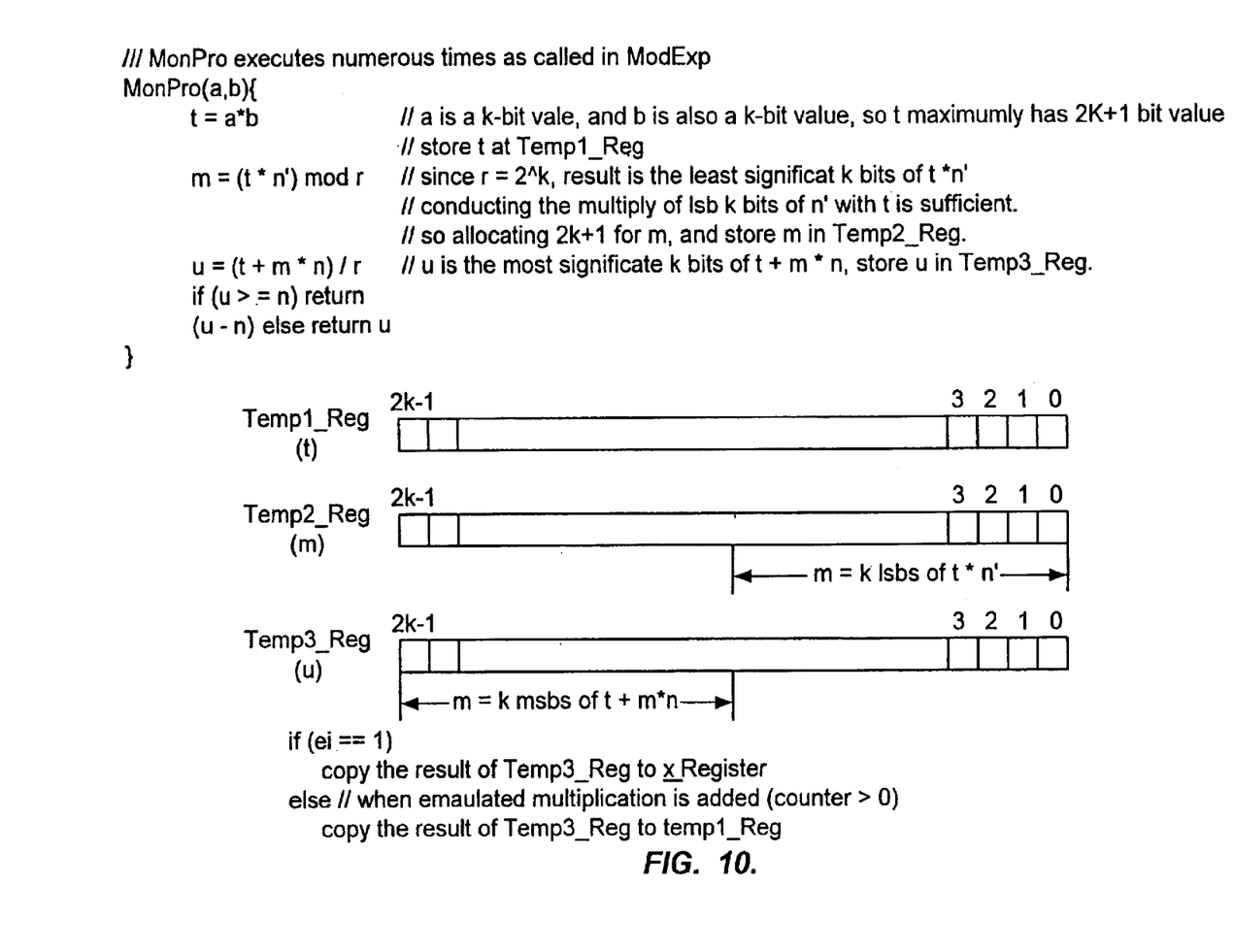

FIGS. 8, 9, and 10 show an example of implementing one embodiment of the invention through the use of the Montgomery algorithm. As those of ordinary skill in art recognize, the Montgomery algorithm is one of the algorithms that implements modular reduction. Beginning with FIG. 8, one can see exemplary code in the lefthand column for implementing the Montgomery algorithm. In the right column, exemplary memory allocation to implement the code is shown. While memory sizes are shown, they are for demonstrative purposes only and should not be taken as limitations for the invention. FIG. 8 shows how registers of the microprocessor are used to store variables and constants utilized by the algorithm. Furthermore, it shows that Temporary Holding Registers are utilized to temporarily hold the results during the implementation of the algorithm. Steps 7–9 denote the process of emulating the first 128 occurrences of "0" in the private key of the example. When one of these "0's" is encountered, the subroutine "MonPro" is called to perform a Montgomery Product. However, this Montgomery Product is not utilized to accomplish the result of the algorithm. Rather, it is discarded. Nevertheless, the processor implements the same acts that would be implemented if the value of the bit in the private key were a "1." Hence, the use of the processor disguises the amount of power usage and time usage, thereby confusing the attacker.

Similarly, FIG. 9 shows code for accomplishing the subroutine "BigMod" which is called by the main program in FIG. 8. Temporary registers of size 2k–1 are shown, as well. Again, the size of these registers is for illustrative purposes only.

Finally, FIG. 10 shows the code for the MonPro subroutine of "BigMod. Note that when the value of a bit in the key is "1" (ei=1) that the result is moved from Temp3 to the x Register. However, when the value of the bit in the key is "0", the result is merely moved to a temporary register and not stored. Hence, the attacker will be fooled by the emulated steps; yet, the emulated steps will not affect the outcome of the algorithm. Furthermore, when the Montgomery algorithm is implemented, FIGS. 8–10 demonstrate that no additional memory is required. Thus, it is advantageous in not requiring additional resources.

The above description has been described based upon what those of ordinary skill in the art understand as integer field mathematics. However, it should also be appreciated that the invention extends to other mathematical systems as well. As an example, the underlying mathematical field for elliptic curve cryptography could be applied as well. It is understood by those of ordinary skill in the art that the mathematical processes of these other fields have equivalents or corollaries to the processes conducted under integer field mathematics, including the processes of multiplication, addition, and exponentiation. Hence, this patent is intended to cover such corollaries and equivalents.

It is thought that the apparatuses and methods of the embodiments of the present invention and many of its attendant advantages will be understood from the foregoing description. It will be apparent that various changes may be made in the form, construction, and arrangement of the parts thereof without departing from the spirit and scope of the invention or sacrificing its material advantages, the form hereinbefore described being merely a preferred or exemplary embodiment thereof. While the invention has been described with an emphasis in the area of decryption processes, it should be understood that other processes are also intended, the decryption process merely providing a beneficial example.

What is claimed is:

1. A method of processing data, comprising:
   receiving a transmission for use with a private key;
   processing said transmission by utilizing said private key;
   disguising power usage required for said processing said transmission; while
   disguising an amount of time required for said processing said transmission;
   processing said transmission by performing a mathematical algorithm on said transmission;
   performing additional mathematical processes in addition to said algorithm, said additional mathematical processes producing a mathematical result unnecessary for said processing; and
   disguising said power usage required and said amount of time required by performing said additional mathematical processes; and
   discarding said mathematical result unnecessary for said processing.

2. The method of processing data as described in claim 1 wherein said performing additional mathematical processes comprises performing multiplication.

3. The method of processing data as described in claim 2 and further comprising performing an unnecessary store of data to memory.

4. The method of processing data as described in claim 1 wherein said disguising said power usage required and amount of time required comprises performing a modulo reduction operation.

5. The method of processing data as described in claim 1 wherein said processing said transmission comprises:
   utilizing an algorithm that comprises a conditional multiplication; said method further comprising:
   performing at least one of said conditional multiplication when said condition is not satisfied.

6. The method of processing data as described in claim 5 and further comprising utilizing a cryptographic key having a numerical representation as said private key.

7. The method of processing data as described in claim 6 wherein said conditional multiplication of said algorithm is determined by at least one bit value of a binary representation of said cryptographic key.

8. The method of processing data as described in claim 5 and further comprising storing a result of said at least one of said conditional multiplication in memory.

9. The method as described in claim 1 wherein said processing said transmission comprises implementing the Montgomery algorithm.

10. An apparatus for use in cryptography, said apparatus comprising:
    a processor;
    an input to said processor to receive a transmission;
    cryptographic code which causes said processor to process said transmission;
    concealment code which causes said processor to perform unnecessary operations so as to disguise power usage and an amount of time used in processing said transmission; and wherein said unnecessary operations comprise an unnecessary multiplication producing a multiplication result that is discarded.

11. The apparatus as described in claim 10 wherein said apparatus further comprises a private key having a binary representation, and wherein said concealment code is operative to cause said processor to perform an emulated function based on a value of a bit of said private key.

12. The apparatus as described in claim 10 wherein said unnecessary operations further comprise unnecessarily storing data to a memory.

13. The apparatus as described in claim 10 wherein said cryptographic code comprises code to implement a Montgomery algorithm.

14. An apparatus comprising:
an integrated circuit;
an input of said integrated circuit for receiving an encoded transmission;
a microprocessor coupled to said input;
decryption code for decrypting said encoded transmission and suitable for use by said microprocessor; and
concealment code for disguising power usage and time usage by said microprocessor in decrypting said encoded transmission;
wherein said concealment code comprises code for implementing an unnecessary multiplication producing a multiplication result not used to decrypt said transmission so as to disguise said power usage and said time usage by said microprocessor in decrypting said encoded transmission.

15. The apparatus as described in claim 14 and further comprising:
a first memory for use by said microprocessor in decrypting said code; and
a second memory for storing a result obtained by said concealment code.

16. A method of processing data, comprising:
receiving an encrypted transmission;
decrypting said encrypted transmission; and
resisting a timing attack of said decrypting while resisting a power attack of said decrypting by implementing an unnecessary multiplication producing a multiplication result not used to decrypt said transmission so as to disguise power usage and time usage by a processor in decrypting said encrypted transmission.

17. A method of processing data comprising:
receiving an encrypted transmission;
using the processor to perform multiply operations;
decrypting said transmission with said multiply operations;
using the processor to perform unnecessary multiply operations producing multiplication results not used to decrypt said transmission; and
disguising power usage required for said decrypting with said unnecessary multiply operations;
disguising an amount of time required for said decrypting with said unnecessary multiply operations.

18. An apparatus comprising:
a consumer electronics device;
a circuit disposed within said consumer electronics device for processing of data;
wherein said circuit is operable to disguise an amount of power usage required to process said data;
wherein said circuit is operable to disguise an amount of time required to process said data;
wherein said amount of power usage and said amount of time required to process said data are disguised by:
performing additional mathematical processes, said additional mathematical processes producing mathematical results not used and being unnecessary for said processing;
discarding said mathematical results.

19. A method of decrypting comprising:
receiving an encrypted transmission;
decrypting said transmission;
disguising power usage required for decrypting said transmission;
disguising an amount of time required for decrypting said transmission;
wherein said decrypting said transmission comprises:
performing a mathematical algorithm on said encrypted message;
utilizing a decryption key as part of said mathematical algorithm;
wherein said disguising power usage and said disguising said amount of time comprises:
performing additional mathematical processes producing a mathematical result not used to decrypt said transmission and said additional mathematical processes being unnecessary for said decrypting; and
performing an unnecessary store of data to memory;
wherein said performing an unnecessary store of data to memory is determined by the value of a bit of said decryption key.

20. The method as described in claim 19 wherein performing a mathematical algorithm comprises performing a Montgomery algorithm.

21. An apparatus for use in cryptography, said apparatus comprising:
a consumer electronics device;
a microprocessor disposed within said consumer electronics device;
an input to said microprocessor to receive an encrypted transmission;
decryption code to cause said microprocessor to decrypt said transmission;
concealment code to cause said microprocessor to perform unnecessary operations producing results not used to decrypt said transmission so as to disguise power usage and an amount of time used in decrypting said transmission; and
a decryption key having a binary representation, wherein said concealment code is operative to cause said microprocessor to perform an emulated function based on a value of a bit of said decryption key.

22. The apparatus as described in claim 21 wherein said decryption code implements the Montgomery algorithm.

* * * * *